United States Patent
Wickzell

[11] Patent Number: 5,356,541
[45] Date of Patent: Oct. 18, 1994

[54] METHOD AND APPARATUS FOR FILTERING A PARTICLE-LIQUID SUSPENSION

[75] Inventor: Bjorn Wickzell, Ekero, Sweden
[73] Assignee: Filterteknik b.w. AB, Bromma, Sweden
[21] Appl. No.: 920,438
[22] PCT Filed: Feb. 27, 1991
[86] PCT No.: PCT/SE 91/00158
 §371 Date: Aug. 25, 1992
 §102(e) Date: Aug. 25, 1992
[87] PCT Pub. No.: WO91/12870
 PCT Pub. Date: Sep. 5, 1991

[30] Foreign Application Priority Data
Feb. 28, 1990 [SE] Sweden ............................ 9000722

[51] Int. Cl.$^5$ ............................................ B01D 29/68
[52] U.S. Cl. ........................................ 210/791; 210/411; 210/413
[58] Field of Search ............ 210/162, 107, 108, 333.01, 210/333.1, 411, 413, 414, 415, 791, 798

[56] References Cited

U.S. PATENT DOCUMENTS

| | | | |
|---|---|---|---|
| 2,949,187 | 8/1960 | Owens | 210/411 |
| 3,112,263 | 11/1963 | Ellila | 210/415 |
| 4,431,541 | 2/1984 | Lee | 210/411 |
| 4,661,253 | 4/1987 | Williams | 210/411 |

FOREIGN PATENT DOCUMENTS

| | | | |
|---|---|---|---|
| 153533 | 2/1956 | Sweden . | |
| 194216 | 2/1965 | Sweden | 210/791 |
| 204133 | 5/1966 | Sweden | 210/791 |
| 389614 | 11/1976 | Sweden | 210/411 |

Primary Examiner—Joseph W. Drodge
Attorney, Agent, or Firm—Sughrue, Mion, Zinn, Macpeak & Seas

[57] ABSTRACT

A method and filter arrangement for filtering particle-contaminated liquid which is caused to spill onto the upper side of a filter 2. Spray pipes 4, equipped with nozzles 5, are rotatably mounted beneath the filter, and spray flushing liquid against the underside of the filter. A drainage channel 7, mounted above the filter surface, catches and directs some of the particle carrying liquid to the outlet 3. The drainage channel has an extended portion which forms a channel inlet and also functions as a splash guard.

12 Claims, 2 Drawing Sheets

METHOD AND APPARATUS FOR FILTERING A PARTICLE-LIQUID SUSPENSION

The present invention relates to the filtration of liquid/particle suspensions, and more particularly, but not exclusively to an arrangement for, and a method of filtering particle-contaminated liquid by a filter, spraying the underside of the filter with a flushing liquid, and removing the particles from the filter.

Filters of the kind to which the invention pertains are intended, for instance, to purify and clarify hot and cold process water and untreated water mechanically. Filters of this kind are often employed in the paper and cellulose industry as a spray water filter among other things, in order to prevent clogging of the spray tubes. Typical applications in this respect include the treatment of circulating scrubber spray water, the treatment of water from the press section of a paper machine, and sealing water from vacuum pumps. Other areas in which such filters are used include the purification and clarification of sea and river water intended for use as fabrication water and cooling water within the process industry, the iron and steel industry, power generating plants and waterworks.

BACKGROUND ART

SE,B,389.614 (Ellilä) describes a circular flat filter, having an annular filter surface which slopes from the periphery of the filter down towards the centre thereof, wherein liquid to be filtered passes from the periphery of the filter surface to an outlet. Mounted beneath the filter surface is one or more nozzle-equipped pipes which deliver filter-flushing liquid to the filter surface and which rotate together with a flushing-liquid supply pipe located in the centre of the filter. The nozzle orifices of the spray tubes are directed obliquely in relation to the longitudinal extension of respective spray tubes.

SE,B,153.533 (Engströms Mek. Verkstad) describes a similar flat filter, in which part of the particle-contaminated liquid is flushed away and collected and passed to an outlet via a drainage channel positioned above the filter surface, this channel being defined by a filter cover and the filter surface.

In principle this solution implies that a jet of liquid "brushes" particles away from the filter gauze or filter surface sideways towards an outlet located on one side of the filter gauze (in essence, similar to washing a garage floor with the aid of a water hose). The drawback with this solution is that particles will still block a substantial part of the filter during their movement towards the outlet. This prevents the whole of the filter surface from being used effectively for the purpose intended, namely to extract particles from the particle-contaminated liquid by filtration.

Further examples of the present standpoint of techniques are found in SE,C,194.216 and SE,C,204.133 (both Ellilä).

When the liquid delivered to the filter contains large quantities of fibres, the liquid will drain-off very slowly, since the fibres will block the holes in the filter, or screening gauze, even when the fibres are moved towards the centre of the filter by the cleaning jets.

SUMMARY OF THE INVENTION

The object of the present invention is to provide a method and an arrangement of the aforedescribed kind which will avoid the blockage of the filter gauze or filter cloth that occurs in earlier known filtering methods and filter arrangements, and therewith increase the effective capacity of the filter and enable larger quantities of liquid to be filtered per unit of time.

These and other objects are fulfilled by the inventive method, which has characteristic features including spraying flushing liquid through the filter from below, so that particles and flushing liquid are projected into a channel above the filter.

Because particles and flushing liquid are captured and conducted to the outlet through the medium of a separate drainage channel located above the filter surface and spaced therefrom, a major part of the filter gauze will be exposed so as to enable a larger quantity of particle-contaminated liquid to be delivered to the process, i.e. the filtering operation gives a greater yield.

In addition, the drainage channel will ensure that the particle-carrying flushing liquid captured in the channel is conducted directly to the outlet. The invention thus affords a synergistic effect which results in improved filter capacity, i.e. it enables larger quantities of particle-contaminated liquid to be filtered than was previously possible.

Alternatively, the same quantity of liquid may have a higher concentration of particles or fibres than has hitherto been possible.

Hitherto, the capacity of a filter has been determined by the mesh size of the filter gauze or like filter cloth and by the quality of the liquid. For instance, when filtering scrubber water deriving from a drying machine and having a fibre consistency of up to about 20 mg/l, the normal capacity of the filter is reduced by about 25%. When filtering white water containing fibres in a consistency of about 100 to 400 mg/l there is chosen a filter gauze having a larger mesh size and the normal capacity is assumed to be reduced by about 50%.

Such reductions in filter capacity are avoided when practising the present invention. Instead, a substantial increase in filter capacity is achieved, even in those cases which are considered difficult or problematic from the earlier standpoint of techniques.

The invention can be applied with particular benefit to various types of flat filter, although it may also be used in other types of filter.

Although the filter gauze is normally stationary and the spray tubes or pipes movable, for instance axially displaceable or rotatable relative to the filter gauze the invention can also be applied in those cases where the filter gauze is movable and the spray tubes are stationary.

In practice, it is preferred that the flushing liquid which takes-up the particles is delivered to the channel through an opening defined between the channel and a part which partially covers said channel and forms a splash-guard. This will ensure that the greatest possible quantity of particle-removing flushing liquid will be conducted into the channel and that as little liquid as possible will splash back onto the filter, particularly when those parts on which the flushing liquid impinges exhibit gently rounded surfaces.

When the invention is applied to a circular flat filter, it is preferred to use two radially extending and downwardly sloping drainage channels, these channels preferably being located in the same diametric plane as the filter.

The invention will now be described in more detail with reference to a number of exemplifying embodiments thereof illustrated in the accompanying schematic drawings.

DESCRIPTION OF EMBODIMENTS AT PRESENT PREFERRED

Figure 1:
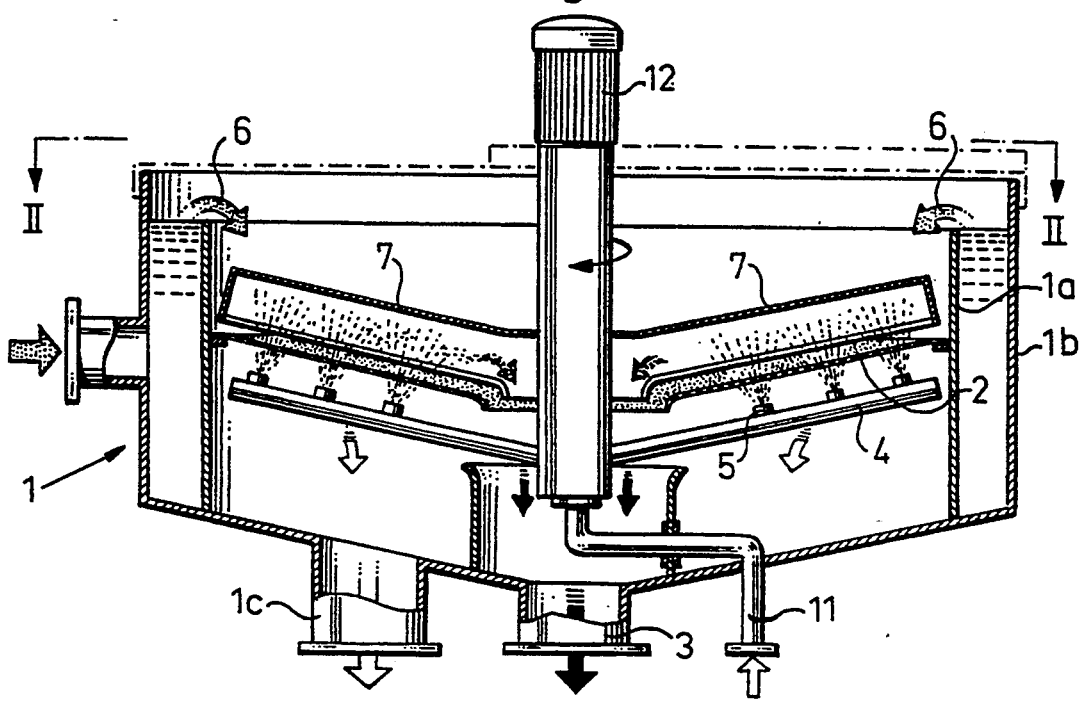
FIG. 1 is a sectional view of a circular flat filter provided with an arrangement according to the invention.
Figure 2:
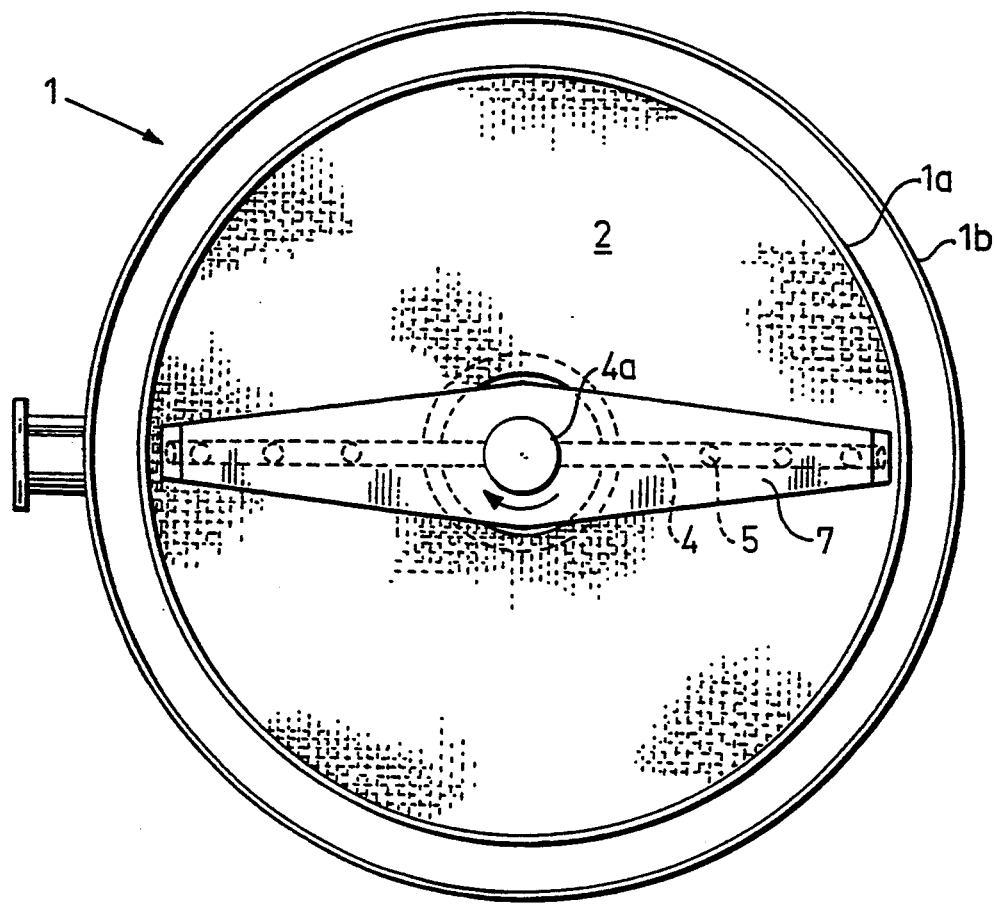
FIG. 2 is a top view of a filter unit according to FIG. 1, with the unit removed from a unit housing and part of the filter gauze being shown in hatch.
Figure 3:
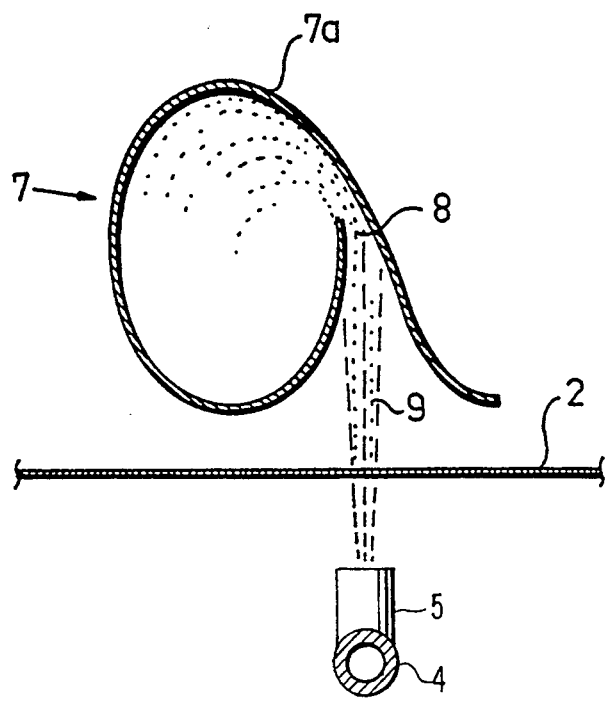
FIG. 3 is a principle drawing which illustrates a filter gauze, a drainage channel located above the gauze, and an underlying spray nozzle.

In FIGS. 1–3, reference numeral 1 identifies a container or housing comprising an inner housing 1a and an outer mantle 1b. The housing 1 has arranged therein a circular flat filter, which represents a filter having flat filter surfaces, comprising a filter gauze or filter cloth 2 the filter surface of which slopes down to form a truncated cone, the outer periphery of which extends to the region of the inner wall of the housing 1, and the inner part of which terminates at a distance from a central outlet 3. Mounted beneath the filter gauze 2 are spray tubes or pipes 4, which extend parallel with the filter surface and which are connected to a delivery pipe 11 mounted in the outlet 3. The spray pipe 4 is rotated at the desired speed, by means of an electric motor 12.

The illustrated filter arrangement includes two spray pipes 4, although it will be understood that this number can be varied. Each of the spray pipes 4 is fitted with a nozzle 5, which directs jets of flushing liquid onto the undersurface of the filter gauze 2.

The housing 1 also includes an outlet 1c, and inlets for particle-contaminated liquid to be filtered, these inlets being shown by arrows 6. In the illustrated embodiment, these inlets have the form of spillways located between the inner housing 1a and the outer mantle 1b.

Arranged above the filter gauze 2 are two diametrically opposed drainage channels 7 which are inclined to the horizontal plane at the same angle as the filter gauze 2 and the bottoms of which channels are thus located at a constant distance from the filter gauze.

FIG. 2 illustrates a meshed part of the filter gauze 2, where the mesh size may vary within wide limits, depending on the nature of the liquid to be filtered.

FIG. 2 also illustrates spray pipes 4 having a central bearing 4a and holes for the spray nozzles 5.

Figure 4:
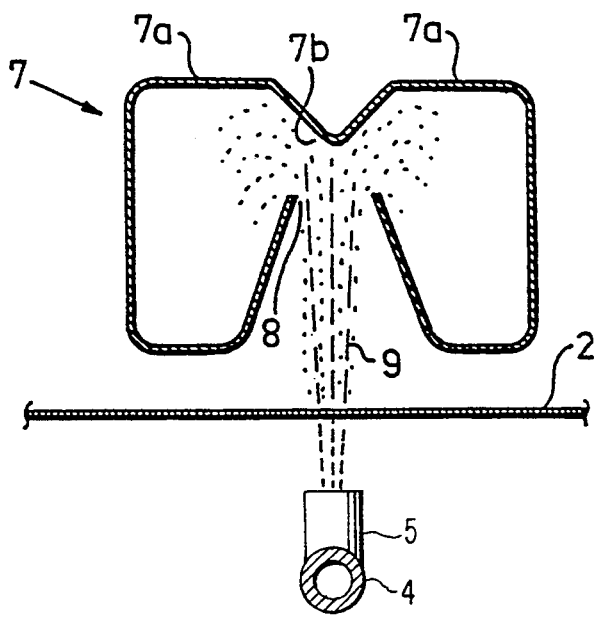
FIG. 4 illustrates a modification to the embodiment illustrated in FIG. 3.

The drainage channel 7 may have the principle configuration illustrated in FIGS. 3 and 4 respectively. An extended part 7a of the channel 7 extends upwards and downwards in a gentle bend, such as to cover the channel while forming an opening 8. The nozzles 5 deliver a jet 9 of flushing liquid under pressure onto the undersurface of the filter gauze 2, and particles gathered by the flushing liquid 9 will be moved into the opening 8 of the channel and there collected for transportation to the centrally arranged outlet 3 (cf FIG. 1). Some of the particles on the filter gauze 2 may not accompany the flushing liquid, but instead be moved stepwise towards the central part of the filter, where these particles also depart through the outlet 3.

In the case of the embodiment illustrated in FIG. 4, two drainage channels 7 extend in mutually adjacent and mutually parallel relationship with one another and have a common inlet 8. Arranged centrally in the part 7a covering the channels 7 is a liquid impingement edge 7b which is located centrally opposite the inlet 8 and which divides the particle-collecting flow of flushing liquid such that approximately half of this flow will fall into respective channels 7.

The part 7a covering respective channels also functions as a splash guard and ensures that the least possible part of the flushing liquid collecting said particles will splash back onto the filter. In the FIG. 3 embodiment, the part 7a has gently rounded surfaces, which contribute to the aforesaid effect.

In the FIG. 1 embodiment, the two drainage channels 7 slope down in the same diametric plane, perpendicular to the filter through its geometric axis. The filter, however, may include additional drainage channels and these channels need not necessarily be arranged symmetrically.

The filter gauze is comprised of a suitable material, for instance steel or a synthetic material. As beforementioned, the mesh width of the filter gauze may vary within wide limits and is contingent on the nature of the liquid to be filtered.

In the illustrated embodiments, the filter 2 is inclined slightly to the central outlet 3. The invention, however, can be applied to other types of filters, for instance filters in which the filter surfaces are truly horizontal.

I claim:

1. A method of filtering particle-contaminated liquid comprising the steps of delivering jets of flushing liquid to an undersurface of a filter through nozzle-equipped spray pipes which are movable in relation to the filter, to flush the filter clean and facilitate transportation of the particles to an outlet, collecting at least some of said flushing liquid and at least some of said particles influenced by pressure of the flushing liquid, and delivering said particles and said flushing liquid to the outlet through a substantially enclosed drainage channel which slopes towards said outlet and which is located above the filter surface at a distance therefrom.

2. A method according to claim 1, further comprising the steps of delivering the particles and flushing liquid to the channel through an opening defined between a bottom of said channel and a portion of said channel which functions as a splash guard.

3. A method according to claim 1, wherein the filter is a circular flat filter defining an annular filter surface which slopes down towards the centre of a circle where the outlet is located, and wherein the nozzle-equipped spray pipes located beneath the filter surface rotate together with a flushing-liquid delivery pipe located in said centre, said method further comprising the step of leading the particles and flushing liquid towards the outlet through two or more, radially extending drainage channels, which slope downwardly in the same diametric plane as the filter.

4. A method according to claim 1, further comprising the step of rotating said drainage channel together with one of said spray pipes to keep said drainage channel directly above said spray pipe.

5. A method according to claim 1, further comprising the step of rotating said filter.

6. A filter arrangement comprising:
 a) a filter gauze (2) having an upper surface and an undersurface,
 b) an outlet (3), c) means for supplying particle-contaminated liquid to be filtered onto the upper surface of said filter gauze (2), d) one or more spray pipes (4) equipped with nozzles (5) and located beneath the filter gauze (2), said spray pipes being connected to a delivery pipe (11) and functioning to direct jets of flushing liquid onto the undersurface of the filter gauze (2), e) means (12) for effecting relative movement between the spray pipes (4) and the filter gauze (2), and f) one or more substantially enclosed drainage channels (7) which slope towards the outlet (3) and which are located above the filter surface (2) in spaced relationship therewith, said channels being arranged to collect flushing liquid and to deliver said liquid to the outlet (3) together with particles collected by said liquid influenced by pressure of the liquid jets (9).

7. An arrangement according to claim 6, wherein said one or more channels respectively comprise a portion (7a) which partially covers the drainage channel and which functions as a splash guard; said portion defining (7a) together with the channel an opening (8) which guides the particles and flushing liquid into said one or more channel.

8. An arrangement according to claim 6, wherein the filter gauze (2) is inclined to the outlet (3), and the one or more drainage channel (7) is inclined substantially at the same angle as the filter gauze (2) in relation to the horizontal plane.

9. An arrangement according to claim 6, wherein the filter gauze is a circular flat filter defining an annular filter surface (2) which is inclined towards the centre of a circle where the outlet (3) is located, wherein the nozzle-equipped spray pipes (4) located beneath the filter undersurface are intended to rotate together with a flushing-liquid delivery pipe located in said centre, and wherein said one or more drainage channels (7) extend radially above the filter surface (2) in spaced relationship therewith, in a common perpendicular plane to the filter gauze through the geometric axis thereof.

10. An arrangement according to claim 9, wherein said one or more drainage channels (7), have a common inlet (8), extend in mutually parallel and adjacent relationship; and wherein an impingement edge (7b) is arranged opposite said common inlet to divide collected particles and flushing liquid impinging on said impingement edge between the two channels (7).

11. An arrangement according to claim 6, wherein each of said one or more drainage channels rotates directly above one of said spray pipes.

12. An arrangement according to claim 6, wherein each of said one or more drainage channels is positioned above one of said spray pipes, and said means for effecting relative movement includes means for rotating said filter gauze.

* * * * *